(12) United States Patent
Harris et al.

(10) Patent No.: US 6,928,481 B1
(45) Date of Patent: Aug. 9, 2005

(54) METHOD, APPARATUS AND PROGRAM TO OPTIMIZE THE NETWORK DISTRIBUTION OF DIGITAL INFORMATION BASED ON HIERARCHICAL GROUPING OF SERVER TOPOLOGY AND CODE DISTRIBUTION

(75) Inventors: Clifford V. Harris, Hurley, NY (US); Michael Vuozzo, Salt Point, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/565,400

(22) Filed: May 5, 2000

(51) Int. Cl.[7] .................. G06F 15/16; G06F 15/173
(52) U.S. Cl. .............. 709/228; 709/217; 709/225; 709/226; 709/229
(58) Field of Search ................. 709/228, 229, 709/224, 225, 226, 227, 238, 219, 220, 221, 222, 223, 217; 370/389; 705/400; 707/104.1

(56) References Cited

U.S. PATENT DOCUMENTS

| | | | | |
|---|---|---|---|---|
| 5,933,835 A | * | 8/1999 | Adams et al. | 707/104.1 |
| 5,951,694 A | * | 9/1999 | Choquier et al. | 714/15 |
| 6,014,651 A | * | 1/2000 | Crawford | 705/400 |
| 6,047,323 A | * | 4/2000 | Krause | 709/227 |
| 6,070,191 A | * | 5/2000 | Narendran et al. | 709/226 |
| 6,112,239 A | * | 8/2000 | Kenner et al. | 709/224 |
| 6,173,322 B1 | * | 1/2001 | Hu | 709/224 |
| 6,240,462 B1 | * | 5/2001 | Agraharam et al. | 709/238 |
| 6,243,379 B1 | * | 6/2001 | Veerina et al. | 370/389 |
| 6,249,801 B1 | * | 6/2001 | Zisapel et al. | 709/105 |
| 6,304,967 B1 | * | 10/2001 | Braddy | 713/150 |
| 6,314,465 B1 | * | 11/2001 | Paul et al. | 709/226 |
| 6,339,785 B1 | * | 1/2002 | Feigenbaum | 709/213 |
| 6,389,448 B1 | * | 5/2002 | Primak et al. | 709/105 |
| 6,411,991 B1 | * | 6/2002 | Helmer et al. | 709/217 |
| 6,415,323 B1 | * | 7/2002 | McCanne et al. | 709/225 |
| 6,516,350 B1 | * | 2/2003 | Lumelsky et al. | 709/226 |
| 6,557,039 B1 | * | 4/2003 | Leong et al. | 709/229 |
| 6,587,959 B1 | * | 7/2003 | Sjolander et al. | 714/4 |
| 6,598,077 B2 | * | 7/2003 | Primak et al. | 709/219 |
| 6,665,702 B1 | * | 12/2003 | Zisapel et al. | 718/105 |

* cited by examiner

*Primary Examiner*—Guy J. Lamarre
(74) *Attorney, Agent, or Firm*—John E. Campbell; Floyd A. Gonzalez

(57) ABSTRACT

A method in a computer network for downloading digital data from one of a plurality of servers to a client computer using a hierarchical algorithm that determines a group of candidate servers based on the ability of the servers to deliver the required digital data and network considerations such as proximity to the client.

29 Claims, 12 Drawing Sheets

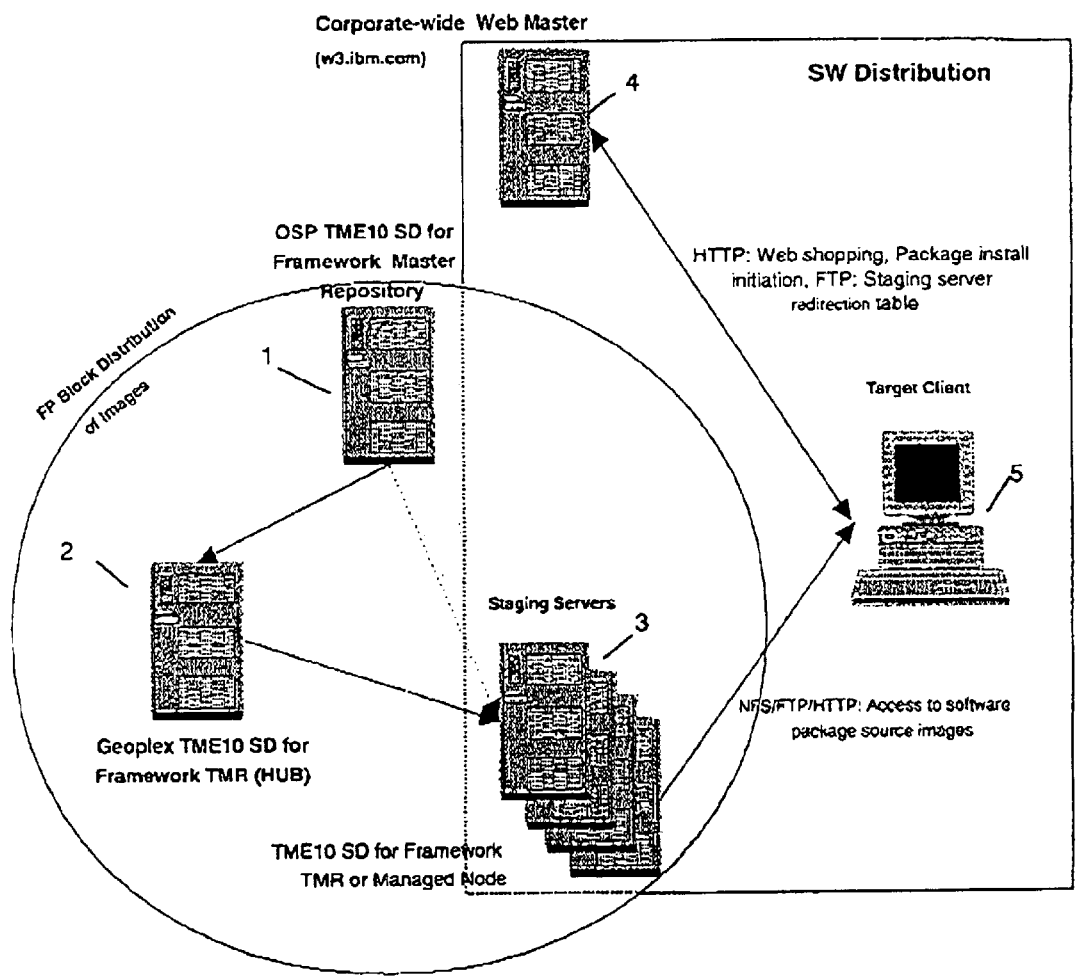
Figure 1 Web Shopping Server Topology

| [Stanza]/Key name | Description |
|---|---|
| xdf | |
| deliverymethod= | Type of delivery; one of: staticweb, dynamicweb, Tiv, NVDM |
| globalname= | Token based package descriptor |
| pkgname= | Descriptive name of package |
| nos= | Network operating system to use to access the image server (CopyLocal,RemoteMount,NFS,FTP,NTS...); Overrides clients WEB.INI. |
| LocalStgPath= | Directory on the client where the product images will be staged to when NOS=FTP/HTTP |
| [First Contact server] | |
| servername= | Fully qualified TCPIP name of the first contact server |
| nos= | Transport method for obtaining the staging server redirection table: NFS,FTP, HTTP |
| remoteserverpath= | Path to the staging server redirection table |
| key= | Flag indicating the encryption level of key1 and key2 (00=key1/key2 plain text, 11= key1/key2 Level 1 encrypted) |
| key1= | Userid for access to the first contact server (if nos=FTP) |
| key2= | Password for access to the first contact server (if nos=FTP) |
| [responses] | |
| <response descriptor>= | 1-"n" response descriptors and responses that will be used to create the installation response file for the package. |
| | |
| Package Parameter File Contents | |

Figure 2 Package Parameter File Contents

| [Stanza]/Key name | Description |
|---|---|
| [ImageServer] | |
| dllName= | Name of the image server dll for OS/2 and 16 bit windows |
| dllName32= | Name of the image server dll for 32 bit windows |
| ServerName= | Fully qualified TCPIP name of the first contact server |
| Nos= | Transport method for obtaining the staging server redirection table: FTP, HTTP |
| LocalStgPath= | Directory on the client where the product images will be staged to when NOS=FTP |
| RemoteServerPath= | Path to the staging server redirection table |
| key= | Flag indicating the encryption level of key1 and key2 (00=key1/key2 plain text, 11= key1/key2 Level 1 encrypted) |
| key1= | Userid for access to the first contact server (if nos=FTP) |
| key2= | Password for access to the first contact server (if nos=FTP) |
| [LogFiles] | |
| TrimLogFile= | Should the OSP log file be trimed to keep it from growing too big? (yes/no) |
| MaxLogFileSize= | Maximum size for the log file in bytes. |

Figure3. Client WEB.INI File Contents

| [Stanza]/Key name | Description |
|---|---|
| [HTTPLogServer] | |
| ServerName= | The fully qualified TCPIP name of the HTTP server to which web installation event logging should be performed |
| ScriptName= | The full path name of the CGI script used to log web installation events |
| [<domainname> \| <subnet> \| <single IP address> \| default_<SDC reference> \| default] | A TCP/IP network domain name, IP subnet specification, SDC default group name, or default; default_<SDC reference> designates a SDC specific default group; default designates the master default server group. |
| NumberOfServers= | The total number of servers defined for this domain |
| ServerX= | The TCP/IP name of Server number X where x is a value of one to NumberOfServers inclusive |
| ProxyServerX= | The TCP/IP name of proxy server X for server X. Follow the name of the server with a colon and the port number of the proxy server if it is not port 80. |
| [<servername>] | |
| Nos= | Network operating system to use to access the image server (NFS,FTP,HTTP,NTS...); Overridden by package parameter file |
| RemoteServerPath= | The root directory on the server where the software repository is located |
| key= | Flag indicating the encryption level of key1 and key2 (00=key1/key2 plain text, 11= key1/key2 Level 1 encrypted) |
| key1= | Userid for access to the image server |
| key2= | Password for access to the image server |
| RemoteMountNos= | Network operating system to use if NOS=RemoteMount is specified |
| CopyLocalNos= | Network operating system to use if NOS=CopyLocal specified |
| httpRemoteServerPath= | The path to the software repository relative to the web server document root |
| httpDirListMethod= | Method for HTTP to use to get the directory listing from the server (CGI,FTP) |
| httpCgiScriptName= | Path to the CGI script to use for HTTP directory listings if httpDirListMethod=cgi |
| adminName= | Name of the administrator for this server |
| adminEmail= | E-Mail address for the administrator. |

Figure 4. Staging Server Redirection Table Contents

Example 1: Using a domain specific server group with a SDC default group

The client workstation has the following TCP/IP information:

| hostname | pugsly.pok.ibm.com |
|---|---|
| i.p. address | 9.117.82.61 |
| subnet mask | 255.255.255.0 |
| subnet | 9.117.82.0 |

Example 2: Using a subnet specific server group w/associated SDC default group

The client workstation has the following TCP/IP information:

| hostname | vuozzo.pok.ibm.com |
|---|---|
| i.p. address | 9.117.162.45 |
| subnet mask | 255.255.255.0 |
| subnet | 9.117.162.0 |

Example 3: Using a domain specific server group without associated SDC default group The client workstation has the following TCP/IP information:

| hostname | sunny.fishkill.ibm.com |
|---|---|
| i.p. address | 9.119.81.61 |
| subnet mask | 255.255.255.0 |
| subnet | 9.119.81.0 |

Figure 5a.

Example 4: Using the master default group

The client workstation has the following TCP/IP information:

| hostname | stumpy.endicott.ibm.com |
|---|---|
| i.p. address | 9.115.61.34 |
| subnet mask | 255.255.255.0 |
| subnet | 9.115.61.0 |

Figure 5b.

Appendix D: First Contact Server Override File Specification (frstcon.ovr)

The first contact server override file is located on the master Web server. It is appended to all package parameter files that are constructed by the ISSI CGI script. The contents of this file are compared to those in the clients WEB.INI file and if different, the WEB.INI file is updated to match this file. This provides the capability to update WEB.INI file settings without end-user intervention

| [Stanza]/Key name | Description |
|---|---|
| ServerName= | Name of the first contact server |
| Nos= | Network operating system to use to access the image server (NFS,FTP,NTS...); Overridden by package parameter file |
| RemoteServerPath= | The root directory on the server where the staging server redirection table is located |
| key= | Flag indicating the encryption level of key1 and key2 (00=key1/key2 plain text, 11= key1/key2 Level 1 encrypted) |
| key1= | Userid for access to the first contact server |
| key2= | Password for access to first contact server |

Sample First Contact Server Override File
servername=d02ftp001.southbury.ibm.com
nos=ftp
remoteserverpath=/home/ospwebcl/swdist/repos
key=11
key1=xxxxx
key2=xxxxx Figure 6. Appendix D: First Contact Server Override File Specification (frstcon.ovr)

Appendix E: Package Server Availability Tables

There will be one package server availability table per package. Each table will list each server that contains the package. The table naming convention is as follows:
<pkgspec>_<nls>_<packaging version>_<package owner>_<OS>.tbl.

| [Stanza]/Key name | Description |
|---|---|
| ServerName1=TRUE | First server containing package |
| ServerName2=TRUE | Second server containing package |
| ... ... | |
| ServerNameN=TRUE | Nth server containing package |

Sample Package Server Availability Table - LFG97000_US_3_PLAT_W32.TBL
morticia.pok.ibm.com=TRUE
sybil.pok.ibm.com=TRUE Figure 7. Appendix E: Package Server Availability Tables

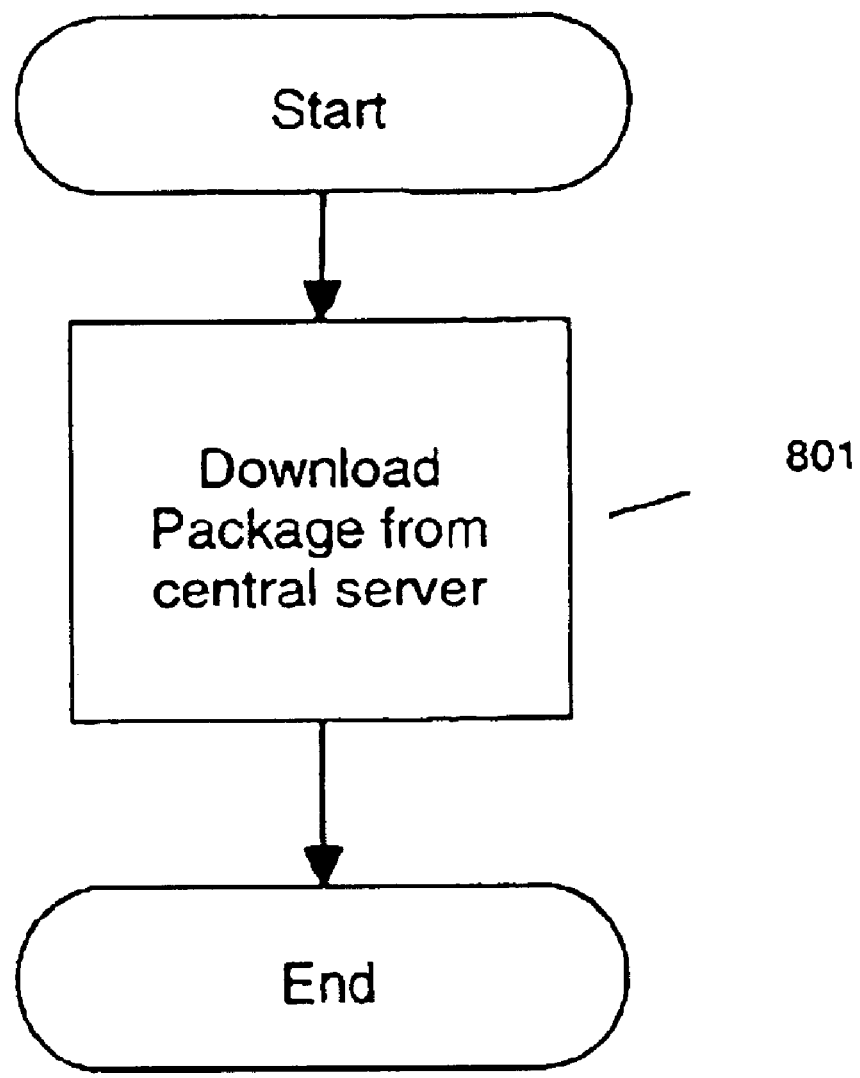
Figure 8- Prior art

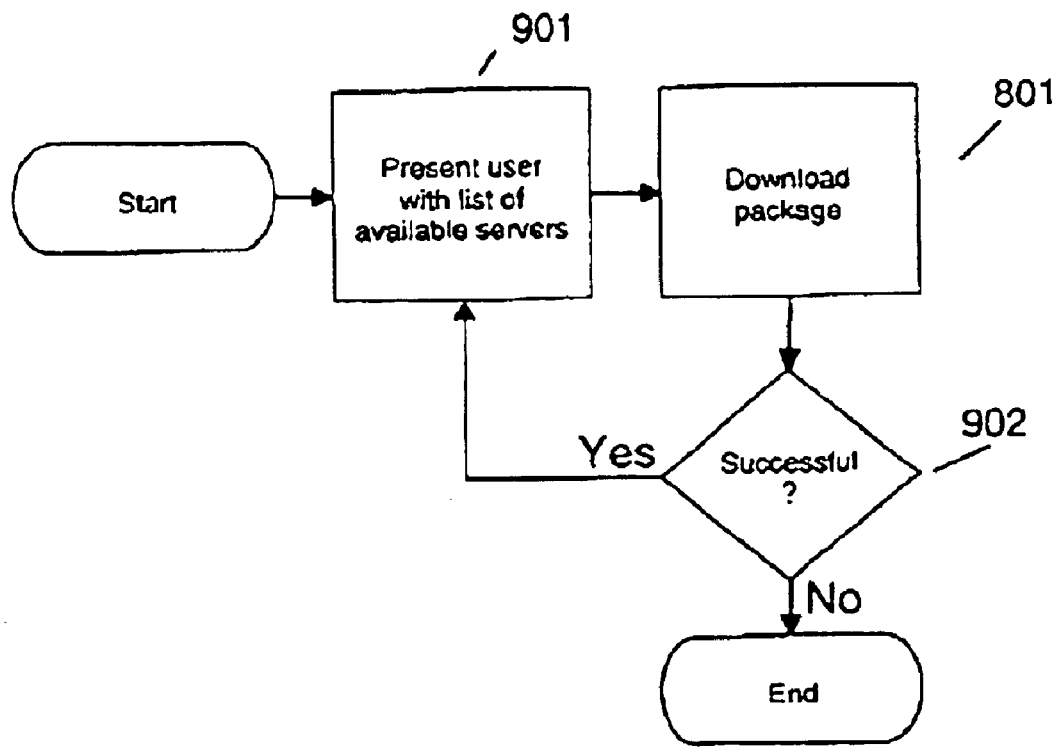
Figure 9- Prior art 2

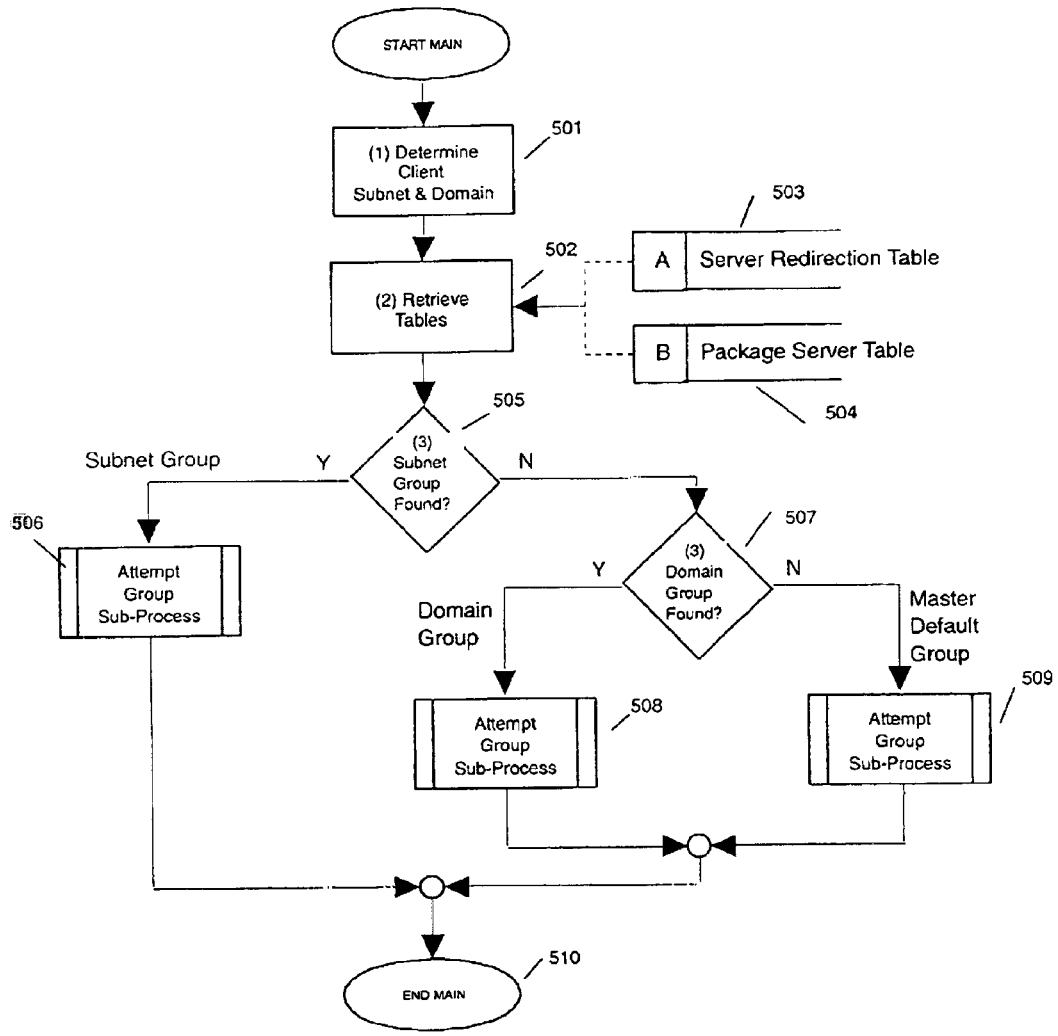
Figure 10 - Redirection Algorithm (Main)

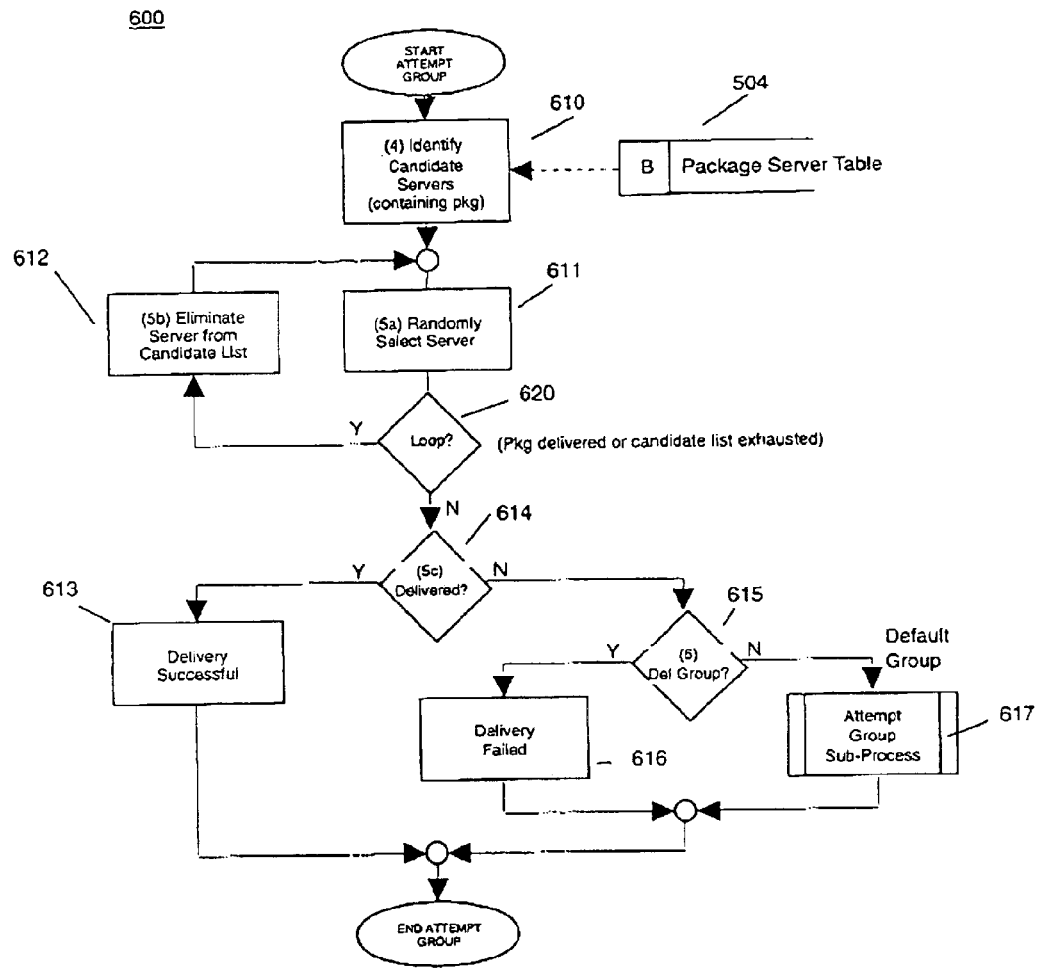
Figure 11 - Redirection Algorithm (Attempt Group Sub-Process)

METHOD, APPARATUS AND PROGRAM TO OPTIMIZE THE NETWORK DISTRIBUTION OF DIGITAL INFORMATION BASED ON HIERARCHICAL GROUPING OF SERVER TOPOLOGY AND CODE DISTRIBUTION

FIELD OF INVENTION

The subject of the present invention in general pertains to computer systems including servers and clients communicating over a network. The invention more particularly relates to efficiently distributing digital information such as Software programs from servers to clients.

BACKGROUND OF THE INVENTION

The industry utilizes a wide variety of software products from a wide variety of sources, designed for a wide variety of environments. In some cases, software applications assist in organizing these products in order to provide consistency among users. As an example, a company may wish to restrict the number and version of applications the end users are using in the company in order to more efficiently manage their IT resources. Program products are needed that provide the service of managing software applications including distributing appropriate versions and updates. FIGS. 8 and 9 depict a high level view of the download process of prior art systems. A list of servers is presented to a user who selects one for downloading a package of digital data 901. If the download is not successful 902, the user can select another server if available. One such product (ISSI) is described as follows:

The IBM Standard Software Installer (ISSI) is a product used to provide a wide variety of program applications within an enterprise to distributed users FIG. 8. The product is described as it might be used within the IBM corporation for example. The product could also be used in any other entity with modifications that would be obvious to one skilled in the art. This electronic software distribution solution does not require that a software distribution product be installed on the clients. This solution is the initial step towards a comprehensive Web-based electronic software distribution solution. The next step, includes a dynamic package catalog and the integration of the TME10 SD for FW as the software distribution engine. This will allow management of the desktop via the other integrated Tivoli applications.

The architectures and, in many aspects, the actual implementation employed in this solution largely follow the Operating System Platforms (OSP) software distribution architectures and implementations that are currently exploited for the Client for e-business WINDOWS 95 available from MICROSOFT CORP., WINDOWS NT 4 available from MICROSOFT CORP., and OS/2 available from INTERNATIONAL BUSINESS MACHINES CORP. (IBM) offerings.

ISSI Solution Highlights:
  A. Easy to use interface for the end-user
  B. Automated installations
    1. Response file driven installations; Minimized end user intervention; configuration consistency; reduced end-user install support (doc, education); reduced end-user induced errors.
      a. Products with native support for response files
      b. OSP's MagicWin installation technology for products that do not support response files natively
    2. Pre-prompting for installation variables; a subset of the total variables required for the package install, predetermined values for others; end-user selects options and install proceeds without further intervention
  A. OSP Packaging Architecture Based Packages
    1. Delivery tool independent; Reusable for all OSP solutions (TME10 SD for AIX (AIX available from IBM is IBM's version of UNIX), TME10 SD for Framework, Static and Dynamic Web, CD source installs).
  C. Consistent technology and package install behavior across all Client for e-business deliverables.
    1. Leveraged service delivery center skill
    2. Leveraged end-user education/expectations
  D. Infrastructure
    1. Established package distribution process
    2. Leverage of existing service delivery center infrastructure
    3. TCP/IP based offering
    4. Multiple servers, selected based on topological closeness to client
    5. After the "One-time client setup" is run, all support code and configuration files that reside on the client are automatically kept current from the server
      a. Server targets definitions
      b. Installer programs
      c. Userids/Passwords for server access (FIG. 1) Illustrative Web Shopping Server Topology
Web "Master" Server The Master URL (http://w3.ibm.com/download/standardsoftware) is hosted by the corporate Web support organization (maintainers of the w3.ibm.com URL). This will provide a single logical server presence and take advantage of the redundancy and load balancing that is provided to all w3.ibm.com hosted web pages. The Master web server will be established by OSP and the GGS project office.

ISSI Pages

The ISSI pages follow the IBM Intranet page standards ensuring a consistent look and feel with other pages hosted on the IBM intranet (w3.ibm.com). Key page destinations within the ISSI "site" are directly accessible from every ISSI page via navigational tabs (NavTab) on the page mastheads for planning for and deploying the ISSI Web based shopping solution.

The hierarchy of the ISSI shopping pages is:
I. Home/Overview
  A. FAQ (available from every page via NavTab)
  B. User's Guide (available from every page NavTab)
  C. Client Setup
  D. Geography Page
  E. Operating System Catalog (available from every page NavTab within Geography)
    1. Package Links
    2. Package Information Page
    3. Package Prompt and Install Page

SUMMARY OF THE INVENTION

It is an object of this invention to provide digital data to a client computer from a preferred server.

It is another object of the invention to determine a preferred server from a group of servers based on proximity of the servers to a client computer.

It is yet another object of the invention to determine a preferred server from a group of servers based on availability of the server.

It is still another object of the invention to provide digital data to a client from a default server if no preferred server is found.

It is further an object of the invention to provide server information relating subnets or domains to servers in order to determine the preferred server.

It is lastly an object of the invention to provide server information relating availability of required digital data at the servers.

These and other objects, features and advantages of the invention will be apparent to those skilled in the art in view of the following detailed description and accompanying drawings.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a high level schematic diagram of a Web Shopping Server network illustrative of the invention.

FIG. 2 depicts example contents of a package parameter file.

FIG. 3 depicts example Client WEB.INI File Contents

FIG. 4 depicts example Staging Server Redirection Table Contents

FIG. 5a depicts 3 examples of server groups.

FIG. 5b depicts 2 examples of server groups.

FIG. 6. (Appendix D): depicts an example First Contact Server Override File Specification (frstcon.ovr)

FIG. 7 (Appendix E): depicts an example Package Server Availability Table

FIG. 8 illustrates a high level flowchart of the prior art ISSI.

FIG. 9 illustrates prior art ISSI flowchart of the download function.

FIG. 10 illustrates an example redirection algorithm of an embodiment of the invention.

FIG. 11 illustrates an example attempt group sub-process of an embodiment of the invention.

DETAILED DESCRIPTION OF THE INVENTION

The ISSI product solves the problem by providing an algorithm that utilizes a set of predefined hierarchies to determine a hierarchy of servers capable of efficiently supplying the required software to the client end user.

Redirection to Image Staging Servers

The Web Master server contains a set of tables that are used to identify the image staging server (defined in section "Staging Server") to be used for a package installation. The first table used is the image staging server redirection table (described in "Appendix C: Image Staging Server Redirection Table Specification"). The table, which defines the global image staging server topology, specifies the following:

A. Each ISSI image staging server.

B. Domain specific server groups.

C. Subnet specific server groups.

D. SDC default server groups.

E. A master default server group.

The table is maintained by OSP with information supplied by service delivery center (SDC) representatives. The table is used by the OSP installation programs to identify the server to be used for a specific package installation. The decision is based on the target machine's TCP/IP domain name or the subnet portion of its IP address. In general, the staging server redirection algorithm uses the domain or subnet information to identify a server group that is geographically close to the client machine. It randomly selects a server from that server group to perform the installation. The algorithm is described in detail in section "Image Staging Server Redirection Algorithm".

SDC representatives provide OSP with the staging server and server group information required to define their SDC's topology. For locations that define TCP/IP domains based on specific geographical locations, domain specific server groups are the preferred method for identifying the candidate servers to be used for deliveries to their clients. For locations were TCP/IP domains are spread over wide or scattered geographical areas, subnet specific server groups are used. SDC representatives may also define a SDC default server group. The SDC default server group is associated with the corresponding SDC domain and/or subnet specific groups. It is used when none of the servers in a domain or subnet specific group can be used to deliver a package (see section "Image Staging Server Redirection Algorithm"). The SDC representative may also specify the "SDC default group message" that is displayed to the customer before a SDC default server group is used. When defining the SDC default group, the SDC representative specifies whether the master default server group is to be used in the case that none of the servers in the SDC default group can be used to install the package.

The table contains a special server group, the master default server group, which is used in two circumstances: (1) when no domain or subnet specific group matches a client's IP information, or (2) when no server in a SDC default server group can be used to deliver a package. The master default server group is guaranteed to contain at least one OSP owned server that contains all production ISSI packages.

In addition to the image server redirection table, the Web master server contains a number of package server availability tables (described in "Appendix E: Package Server Availability Tables"). The server contains one table per ISSI package. Each table contains the names of the staging servers that contain the package. The tables are generated by an agent which periodically connects to every staging server to discover its packages. In general, the staging server redirection algorithm uses the corresponding package server availability table to identify the servers within a selected server group that contain the respective package.

Image Staging Server Redirection Algorithm

The OSP staging server redirection algorithm follows:

1. Obtain the target machine's TCP/IP address, subnet mask and domain 501. Using the IP address and subnet mask, determine the target machine's subnet.

2. Retrieve 502 the image staging server redirection table 503 and the corresponding package server availability table 504.

3. Using the image staging server redirection table 503, identify the server group to be used as the "group of candidate servers" 505. First, look for a matching subnet specific server group 506. If none is found, then look for a domain specific server group 507. If none is found 508, then use the master default server group 509.

4. Using the package server availability table 504, identify the servers in the group of candidate servers that contain the package 610. Remove servers that do not contain the package from the group of candidate servers 612.

5. Randomly choose a server from the group of candidate servers 611. If a failure occurs connecting to the server or downloading the package image from the server 620, then the chosen server is excluded from the group of candidate servers 612. If the group of candidate servers is exhausted 620, then proceed with the next step 614. Otherwise, repeat this step 610.

6. If none of the servers in the group of candidate servers can be used to successfully install the product 615, then determine the type of default server group specified for the group of candidate servers (by inspecting keyword "default_group") 617. Proceed as depending on the type of default server group specified:

i. If no default server group is specified ("default_group=NONE"), then the installation can not be performed 616. If the group of candidate servers is the master default group, then no default server group will be specified for it. Note that the master default server group is the last server group that can possibly be attempted, so it must be specified with no default group.

ii. If a SDC default server group is specified ("default_group=default_<SDC reference>"), then repeat steps 4–6 (610–614) with the SDC default server group as the group of candidate servers. If an SDC default group message is available, the message is first displayed to inform the user than an SDC default group is about to be used.

iii. If the master default server group is specified ("default_group=default"), then repeat steps 4–6 (610–614) with the master default server group as the group of candidate servers. A standard message is first displayed to inform the user that the master default group is about to be used.

ISSI CGI

The ISSI master server has a CGI script defined to process end-user input from the Web interface. This input is entered by the end-user on the specific package installation page. The CGI uses the end-user input to construct a package parameter file that describes the package that is to be installed and key customization options selected for the target machine.

First Contact Server Override File

The first contact server contains the server redirection table. The default first contact server for this solution is the corporate intranet FTP server. The master web server for ISSI contains a file that allows an override to the client's definitions for: the first contact server, directory for the staging server redirection table, access protocol (NOS) and the userid and password. The override is accomplished by including the contents of the override file in each package parameter file sent to the client during package delivery. This facilitates automated maintenance of the first contact server definition. The format of this file is described in "Appendix D: First Contact Server Override File Specification (frstcon.ovr)"

Staging Server

The staging server hosts the installation images of the software packages. These images are installed directly from the staging server via NFS or moved to the target via FTP or HTTP for local installation.

Source Image Location

The source image repository can be located ("rooted") anywhere on the staging server. This location must correlate with the RemoteServerPath value stored in the image server redirection table for that staging server. Subordinate directories must follow the OSP Packaging Architecture.

Source Image Access

A userid and password pair is used to access the source images via FTP when the local staging option has been selected.

Directory Structure

The package repository specification is consistent with the OSP packaging directory structure.

Example Embodiment

The electronic distribution and installation of software by "pull" requires that a recipient Client machine successfully connect to a provider Server ("Client" herein refers to a target machine requesting software and "Server" refers to a package, or image, staging server):

A. that is available on the network (functionally in operation, not "down"),

B. that contains the desired software/data package, and

C. that will authenticate permission to perform the operation.

In addition, it is desirable that the Server be:

A. reachable via a common point of contact,

B. capable of membership in a global layout of heterogeneously-populated peer Servers, C. topologically near to the Client, D. randomly chosen for the purpose of load balancing from a group of topologically-equidistant peer Servers if such group exists, and E. provide a fallback Server option or succession of options.

The IBM Standard Software Installer (henceforth ISSI) was developed and is frequently enhanced to meet these needs. ISSI does not require that the Client be registered to a specific server, rather, an ISSI client need only visit a central web site to select a software package for download and installation. Upon selection of a specific software package the underlying logic of ISSI will:

A. determine the location of the Client in the network topology,

B. create a list (candidate server table) of the names of potential Servers prioritized and grouped by various parameters such as topological-nearness, C. retrieve a list (package server availability table) of the names of Servers that actually are populated with the desired package, D. filter the candidate server table by eliminating those that are not also found in the package server availability table, E. chose a Server from the highest priority grouping in the filtered candidate server table, then attempt a delivery and installation. In the event of a failure (possibly due to the Server not be available on the network) an alternative Server is chosen from the same Server grouping (if one is available, or from the next lower priority Server grouping if not) and the delivery re-attempted. If repeated failures and the associated invalidation of those Servers exhaust the candidate server table, then a master "default server group" list is used. In the forgoing, choosing is accomplished by any effective algorithm known including "pseudo" randomly. The logic described in this step forms the central idea of this disclosure.

Note: the package server availability table is automatically updated on a regular basis by an agent that queries the set of known Servers for package availability.

The specific invention disclosed is the inclusion of the hierarchy of Server groupings into the existing ISSI architecture. An example of a Server grouping hierarchy, in order of decreasing priority, is:

Server Grouping Hierarchy

A. Building 052 (subnet)
B. Poughkeepsie site (domain)
C. New York State
D. North-Eastern Region
E. East Coast
F. United States
G. Default The advantage of the Server grouping hierarchy method is that it enables the possibility of rapidly assembled and easily managed aggregation of Servers into groups that can be ranked and exploited by ISSI using topology-sensitive and package distribution-sensitive logic.

The master web server contains a set of tables that are used to identify the Server to be used for a package installation. The first table used is the Server redirection table. The table, which defines the global Server topology, specifies the following:

Server Redirection Table

A. Each ISSI Server
B. Domain specific server groups
C. Subnet specific server groups
D. Locale specific default server groups.
E. A master default server group.

The table is maintained by the Service Provider with information supplied by service delivery center (locale-specific, or "SDC") representatives. The table is used by the Service Provider's installation programs to identify the server to be used for a specific package installation. The decision is based on the target machine's TCP/IP domain name or the subnet portion of its IP address. In general, the staging server redirection algorithm uses the domain or subnet information to identify a server group that is geographically close to the client machine. It randomly selects a server from that server group to perform the installation. Locale-specific representatives provide the Service Provider with the staging server and server group information required to define their locale's topology. For locations that define TCP/IP domains based on specific geographical locations, domain specific server groups are the preferred method for identifying the candidate servers to be used for deliveries to their clients. For locations were TCP/IP domains are spread over wide or scattered geographical areas, subnet specific server groups are used. Locale-specific representatives may also define a locale-specific default server group. The locale-specific default server group is associated with the corresponding locale-specific domain and/or subnet specific groups. It is used when none of the servers in a domain or subnet specific group can be used to deliver a package. The locale-specific representative may also specify the "SDC default group message" that is displayed to the customer before a locale-specific default server group is used. When defining the locale-specific default group, the locale-specific representative specifies whether the master default server group is to be used in the case that none of the servers in the locale-specific default group can be used to install the package. The table contains a special server group, the master default server group, which is used in two circumstances: 1) when no domain or subnet specific group matches a client's IP information, or 2) when no server in a locale-specific default server group can be used to deliver a package. The master default server group is guaranteed to contain at least one Service Provider owned server that contains all production ISSI packages.

In addition to the image server redirection table, the master web server contains a number of package server availability tables The server contains one table per ISSI package. Each table contains the names of the staging servers that contain the package. The tables are generated by an agent which periodically connects to every staging server to discover its packages. In general, the staging server redirection algorithm uses the corresponding package server availability table to identify the servers within a selected server group that contain the respective package.

Preferred Embodiment of an Server Redirection Algorithm

The Server redirection algorithm follows:

1. Obtain the Client machine's TCP/IP address, subnet mask and domain. Using the IP address and subnet mask, determine the Client machine's subnet. 501
2. Retrieve the Server redirection table 503 and the corresponding package server availability table 504 from the first contact server. 502
3. Using the Server redirection table 503, identify the server group to be used as the "group of candidate servers". First, look for a matching subnet specific server group 506. If none is found, then look for a domain specific server group 507. If none is found, then use the master default server group 508.
4. Using the package server availability table 504, identify the Servers in the group of candidate servers that contain the package. Remove Servers that do not contain the package from the group of candidate servers 610.
5. Randomly choose a Server from the group of candidate servers 611. If a failure occurs connecting to the Server or downloading the package image from the Server, then the chosen Server is excluded from the group of candidate servers 612. If the group of candidate servers is exhausted, then proceed with the next step. Otherwise, repeat this step. 620
6. If none of the Servers in the group of candidate servers can be used to successfully install the product, then determine the type of default server group specified for the group of candidate servers (by inspecting keyword "default_group") 614. Proceed as follows depending on the type of default server group specified: 615
    i. If no default server group is specified ("default_group=NONE"), then the installation can not be performed. If the group of candidate servers is the master default group, then no default server group will be specified for it. Note that the master default server group is the last server group that can possibly be attempted, so it must be specified with no default group. 616
    ii. If a locale-specific default server group is specified ("default_group=default_<SDC reference>"), then repeat steps 4–6 with the locale-specific default server group as the group of candidate servers. If an locale-specific default group message is available, the message is first displayed to inform the user than an locale-specific default group is about to be used 617.

If the master default server group is specified ("default_group=default"), then repeat steps 4–6 with the master default server group as the group of candidate servers. A standard message is first displayed to inform the user that the master default group is about to be used 617.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for downloading a package of digital data from a server computer to a client computer, the method comprising the steps of:
    a) receiving a request to download a specified package of digital data to a requesting client computer;
    b) receiving a client identifier from the requesting client computer, the client identifier identifying the requesting client computer;
    c) retrieving server redirection information from storage, the server redirection information comprising a plurality of types of server groups, wherein a first type of server group comprises a first representation of one or more groups of candidate server identities, each group of first candidate server identities comprising one or more first candidate server identities, wherein a candidate server identity identifies a server, wherein a second type of server group comprises a representation of one or more groups of second candidate server identities, each group of second candidate server identities comprising one or more second candidate server identities, wherein according to a predetermined designation the second type of server group is designated to provide the specified package when the first type of server group is unable to provide the specified package;
    d) retrieving availability information from storage, the availability information comprising the identities of servers having the specified package of digital data available for downloading;
    e) selecting from the first type of server group a group of first candidate server identities the selection based on retrieved server redirection information in combination with the received client identifier;
    f) determining from the selected group of first candidate server identities, target first candidate server identities identifying target first servers having the specified package of digital data, the determination based on the retrieved availability information;
    g) when the target first servers are identified, selecting one of the target first candidate server identities as a selected target first server identity;
    h) when the selected target first server is identified, downloading components of the specified package of digital data from the selected target first server identified by the selected target first candidate server identity having the specified package;
    i) when the specified package of digital data is not downloadable from a server of the group of first candidate server identities, selecting from the second type of server group a group of second candidate server identities the selection based on retrieved server redirection information in combination with the received client identifier;
    j) determining from the selected group of second candidate server identities, target second candidate server identities identifying target second servers having the specified package of digital data, the determination based on the retrieved availability information;
    k) when the target second servers are identified, selecting one of the target second candidate server identities as a selected target second server identity; and
    l) when the selected target second server is identified, downloading components of the specified package of digital data from the selected target second server identified by the selected target second candidate server identity having the specified package.

2. The method according to claim 1, wherein the client identifier comprises any one of a client name, a client IP address, a client Internet domain or a client Internet subnet mask.

3. The method according to claim 1, wherein any one of the availability information or the server redirection information comprises a table of server identities.

4. The method according to claim 1, wherein any one of the target first server is selected from the selected group of candidate servers using any one of a randomizing algorithm or a load balancing algorithm or the target second server is selected from the selected group of candidate servers using any one of a randomizing algorithm or a load balancing algorithm.

5. The method according to claim 1, comprising the further step of downloading at least some of the specified package of digital data from a third server.

6. The method according to claim 1, comprising the further steps of:
    w) when the specified package of digital data is not downloadable from the selected target first server, eliminating the target first candidate server identity associated with the selected target first server from the selected group of first candidate server identities; and
    x) repeating steps g) through h).

7. The method according to claim 1, comprising the further steps of:
    y) when the specified package of digital data is not downloadable from the selected target second server, eliminating the target second candidate server identity associated with the selected target second server from the selected group of second candidate server identities; and
    z) repeating steps k) through l).

8. The method according to claim 1, wherein a type of server group is defined according to any one of geography, organization, Internet Domain, Internet Subnet, custom default or Master default.

9. The method according to claim 1, wherein any one of the first type of server group or the second type of server group comprises any one of a domain specific server group a subnet specific server group, a custom default server group or a master default server group.

10. The method according to claim 1, wherein the first type of server group and the second type of server group are selected from the plurality of types of server groups according to a predetermined hierarchical sequence.

11. The method according to claim 1, comprising the further steps of:
    periodically connecting to servers of the plurality of types of server groups;

discovering whether the specified package of digital data is contained on the servers;

updating the availability information according to the discovery step; and storing the updated availability information.

12. The method according to claim 1, wherein a package of digital data is associated with availability information for the package of digital data.

13. A system for downloading a package of digital data from a server computer to a client computer, the system comprising:

a network;

a client computer system in communication with the network;

a server computer system in communication with the network, wherein the server computer system includes instructions to execute a method comprising the steps of:

a) receiving a request to download a specified package of digital data to a requesting client computer;

b) receiving a client identifier from the requesting client computer, the client identifier identifying the requesting client computer;

c) retrieving server redirection information from storage, the server redirection information comprising a plurality of types of server groups, wherein a first type of server group comprises a first representation of one or more groups of candidate server identities, each group of first candidate server identities comprising one or more first candidate server identities, wherein a candidate server identity identifies a server, wherein a second type of server group comprises a representation of one or more groups of second candidate server identities, each group of second candidate server identities comprising one or more second candidate server identities, wherein according to a predetermined designation the second type of server group is designated to provide the specified package when the first type of server group is unable to provide the specified package;

d) retrieving availability information from storage, the availability information comprising the identities of servers having the specified package of digital data available for downloading;

e) selecting from the first type of server group a group of first candidate server identities the selection based on retrieved server redirection information in combination with the received client identifier;

f) determining from the selected group of first candidate server identities, target first candidate server identities identifying target first servers having the specified package of digital data, the determination based on the retrieved availability information;

g) when the target first servers are identified, selecting one of the target first candidate server identities as a selected target first server identity;

h) when the selected target first server is identified, downloading components of the specified package of digital data from the selected target first server identified by the selected target first candidate server identity having the specified package;

i) when the specified package of digital data is not downloadable from a server of the group of first candidate server identities, selecting from the second type of server group a group of second candidate server identities the selection based on retrieved server redirection information in combination with the received client identifier;

j) determining from the selected group of second candidate server identities, target second candidate server identities identifying target second servers having the specified package of digital data, the determination based on the retrieved availability information;

k) when the target second servers are identified, selecting one of the target second candidate server identities as a selected target second server identity; and l) when the selected target second server is identified, downloading components of the specified package of digital data from the selected target second server identified by the selected target second candidate server identity having the specified package.

14. The system according to claim 13, wherein the client identifier comprises any one of a client name, a client IP address, a client Internet domain or a client Internet subnet mask.

15. The system according to claim 13, comprising the further steps of:

w) when the specified package of digital data is not downloadable from the selected target first server, eliminating the target first candidate server identity associated with the selected target first server from the selected group of first candidate server identities; and x) repeating steps g) through h).

16. The system according to claim 13, wherein any one of the first type of server group or the second type of server group comprises any one of a domain specific server group a subnet specific server group, a custom default server group or a master default server group.

17. The system according to claim 13, comprising the further steps of:

periodically connecting to servers of the plurality of types of server groups;

discovering whether the specified package of digital data is contained on the servers;

updating the availability information according to the discovery step; and storing the updated availability information.

18. A computer program product for downloading a package of digital data from a server computer to a client computer, the computer program product comprising:

a storage medium readable by a processing circuit and storing instructions for execution by the processing circuit for performing a method comprising the steps of:

a) receiving a request to download a specified package of digital data to a requesting client computer;

b) receiving a client identifier from the requesting client computer, the client identifier identifying the requesting client computer;

c) retrieving server redirection information from storage, the server redirection information comprising a plurality of types of server groups, wherein a first type of server group comprises a first representation of one or more groups of candidate server identities, each group of first candidate server identities comprising one or more first candidate server identities, wherein a candidate server identity identifies a server, wherein a second type of server group comprises a representation of one or more groups of second candidate server identities, each group of second candidate server identities comprising one or more second candidate server identities, wherein according to a predetermined designation the second type of server group is designated to provide the specified package when the first type of server group is unable to provide the specified package;

d) retrieving availability information from storage, the availability information comprising the identities of servers having the specified package of digital data available for downloading;

e) selecting from the first type of server group a group of first candidate server identities the selection based on retrieved server redirection information in combination with the received client identifier;

f) determining from the selected group of first candidate server identities, target first candidate server identities identifying target first servers having the specified package of digital data, the determination based on the retrieved availability information;

g) when the target first servers are identified, selecting one of the target first candidate server identities as a selected target first server identity;

h) when the selected target first server is identified, downloading components of the specified package of digital data from the selected target first server identified by the selected target first candidate server identity having the specified package;

i) when the specified package of digital data is not downloadable from a server of the group of first candidate server identities, selecting from the second type of server group a group of second candidate server identities the selection based on retrieved server redirection information in combination with the received client identifier;

j) determining from the selected group of second candidate server identities, target second candidate server identities identifying target second servers having the specified package of digital data, the determination based on the retrieved availability information;

k) when the target second servers are identified, selecting one of the target second candidate server identities as a selected target second server identity; and l) when the selected target second server is identified, downloading components of the specified package of digital data from the selected target second server identified by the selected target second candidate server identity having the specified package.

19. The computer program product according to claim 18, wherein the client identifier comprises any one of a client name, a client IP address, a client Internet domain or a client Internet subnet mask.

20. The computer program product according to claim 18, wherein any one of the availability information or the server redirection information comprises a table of server identities.

21. The computer program product according to claim 18, wherein any one of the target first server is selected from the selected group of candidate servers using any one of a randomizing algorithm or a load balancing algorithm or the target second server is selected from the selected group of candidate servers using any one of a randomizing algorithm or a load balancing algorithm.

22. The computer program product according to claim 18, comprising the further step of downloading at least some of the specified package of digital data from a third server.

23. The computer program product according to claim 18, comprising the further steps of:

w) when the specified package of digital data is not downloadable from the selected target first server, eliminating the target first candidate server identity associated with the selected target first server from the selected group of first candidate server identities; and x) repeating steps g) through h).

24. The computer program product according to claim 18, comprising the further steps of:

y) when the specified package of digital data is not downloadable from the selected target second server, eliminating the target second candidate server identity associated with the selected target second server from the selected group of second candidate server identities; and z) repeating steps k) through l).

25. The computer program product according to claim 18, wherein a type of server group is defined according to any one of geography, organization, or default.

26. The computer program product according to claim 18, wherein any one of the first type of server group or the second type of server group comprises any one of a domain specific server group a subnet specific server group, a custom default server group or a master default server group.

27. The computer program product according to claim 18, wherein the predetermined designation comprises a server group type sequence wherein the search priority relationship of each server group type to be searched is defined.

28. The computer program product according to claim 18, comprising the further steps of:

periodically connecting to servers of the plurality of types of server groups;

discovering whether the specified package of digital data is contained on a server of the plurality of types of server groups;

updating the availability information according to the discovery step; and storing the updated availability information.

29. The computer program product according to claim 18, wherein a separate availability information file is stored for each package of digital data requiring availability information.

* * * * *